(12) United States Patent
Taylor (10) Patent No.: US 6,712,304 B1
(45) Date of Patent: Mar. 30, 2004

(54) CELLULAR COMMUNICATION DEVICE WITH INTEGRAL HEADSET RETRACTION ASSEMBLY

(76) Inventor: Chad Dylan Taylor, 5304 Petral Ct., Wilmington, NC (US) 28409

( * ) Notice: Subject to any disclaimer, the term of this patent is extended or adjusted under 35 U.S.C. 154(b) by 0 days.

(21) Appl. No.: 10/097,685

(22) Filed: Mar. 13, 2002

(51) Int. Cl.[7] .................. B65H 75/42; B65H 75/48; H04M 1/15

(52) U.S. Cl. .............. 242/379; 242/385.1; 242/402; 455/575.2

(58) Field of Search .................. 242/385, 385.1, 242/379, 402; 191/12.4; 455/550, 568, 575, 569, 550.1, 569.1, 575.1, 575.2; 379/433.01

(56) References Cited

U.S. PATENT DOCUMENTS

| | | | |
|---|---|---|---|
| 4,901,938 A | * | 2/1990 | Cantley et al. .......... 242/378.1 |
| 5,128,993 A | * | 7/1992 | Skowronski ............... 379/438 |
| 5,201,003 A | * | 4/1993 | Pavel ....................... 382/309 |
| D346,382 S | * | 4/1994 | Ando et al. ................ D14/138 |
| 5,339,461 A | * | 8/1994 | Luplow ..................... 455/351 |
| 5,511,120 A | * | 4/1996 | Hirata et al. ........... 379/433.02 |
| 5,535,960 A | | 7/1996 | Skowronski et al. |
| 5,669,571 A | | 9/1997 | Graybill |
| 5,684,883 A | * | 11/1997 | Chen ........................ 381/385 |
| 5,724,667 A | * | 3/1998 | Furuno .................... 455/575.2 |
| 5,791,580 A | | 8/1998 | Anderson et al. |
| 5,832,098 A | * | 11/1998 | Chen ........................ 381/370 |
| 5,913,487 A | | 6/1999 | Leatherman |
| 5,943,627 A | * | 8/1999 | Kim et al. ............... 455/569.1 |
| 6,048,211 A | | 4/2000 | Liaom |
| 6,082,656 A | * | 7/2000 | Thornton ................. 242/385.4 |
| 6,199,674 B1 | * | 3/2001 | Liao .......................... 191/12.4 |
| 6,250,578 B1 | | 6/2001 | Manda |
| 6,312,278 B1 | | 11/2001 | Prior |
| 6,315,231 B1 | | 11/2001 | Liaom |
| 2002/0090981 A1 | * | 7/2002 | Bae ............................. 455/568 |
| 2003/0067171 A1 | * | 4/2003 | Liao |

* cited by examiner

Primary Examiner—Kathy Matecki
Assistant Examiner—Scott J. Haugland
(74) Attorney, Agent, or Firm—John D. Gugliotta; P. Jeff Martin (57) ABSTRACT

A cellular communication phone with integral headset retraction device is provided. The headset retraction device is integrally molded to a lower portion of the rear side of the phone. The headset retraction device includes a housing which serves to store a cable reel having a cable retracting mechanism and an electrical conducting cable. The electrical conducting cable includes a micro-sized microphone connected between an audio receiver earpiece and an auxiliary plug connector. An auxiliary plug storage receptacle is provided in order to prevent free suspension of the auxiliary plug connector. A cable guidance column is provided to aid in directing the electrical conducting cable into the retraction housing when being wound therein. An earpiece retention jacket is disclosed for supporting the audio receiver earpiece.

10 Claims, 5 Drawing Sheets

CELLULAR COMMUNICATION DEVICE WITH INTEGRAL HEADSET RETRACTION ASSEMBLY

RELATED APPLICATIONS

The present invention was first described in Disclosure Document No. 503,334 filed on Jan. 10, 2002. There are no previously filed, nor currently any co-pending applications, anywhere in the world.

BACKGROUND OF THE INVENTION

1. Field of the Invention

The present invention relates generally to portable cellular phones and, more particularly, to a cellular communication device with integral headset retraction assembly.

2. Description of the Related Art

Today, cellular phones have become an indispensable device utilized by society in immeasurable numbers due to their practicality, cost effectiveness, and convenience of use. However, cellular phones are not without inherent drawbacks. While driving, many individuals make cellular calls which necessarily requires the use of at least one hand to operate and hold the cellular phone, thereby substantially increasing the risk of an inadvertent automobile accident causing possible injury to oneself and others. In addition, overexposure to cellular radiation has become a recognized phenomenon warranting consumer concern.

Accordingly, a need has arisen for a means by which a cellular communication phone can be utilized in a hands-free manner. The development of the cellular communication device with integral headset retraction assembly fulfills this need.

A search of the prior art did not disclose any patents that read directly on the claims of the instant invention; however, the following references were considered related.

U.S. Pat. No. 5,669,571 issued in the name of Graybill discloses an electrical cord storage and dispensing device.

U.S. Pat. No. 5,535,960 issued in the name of Skowronski et al. discloses a cord reel for electrical wiring.

U.S. Pat. No. 5,791,580 issued in the name of Anderson et al. discloses a cord retraction housing for a retractable electrical power cord.

U.S. Pat. No. 5,913,487 issued in the name of Leatherman discloses a multiple cable retraction system.

U.S. Pat. No. 6,250,578 issued in the name of Manda discloses cable winding housing.

U.S. Pat. No. 6,048,211 issued in the name of Liaom discloses a reversible cable reel.

U.S. Pat. No. 6,312,278 issued in the name of Prior discloses a cable pad and guide for routing computer peripheral cables.

U.S. Pat. No. 6,315,231 issued in the name of Liaom discloses a wire winding housing for micro-type communication wiring.

Consequently, a need has been felt for providing a cellular communication phone with integral, retractable headset for use in a hands-free manner which is quick, easy, and efficient.

SUMMARY OF THE INVENTION

Therefore, it is an object of the present invention to provide a cellular communication device allowing for hands-free use.

It is another object of the present invention to provide a cellular communication device having an integral headset retraction assembly.

It is another object of the present invention to provide an integral headset retraction assembly having a protective housing.

It is another object of the present invention to provide an integral headset retraction assembly with a cable retractor allowing extensible retraction by an electrical conducting cable.

It is another object of the present invention to provide an electrical conducting cable having an audio receiver earpiece electrically connected at one end and an auxiliary plug connector electrically connected at an end opposite thereto.

It is still another object of the present invention to provide a micro-sized microphone electrically connected between the audio receiver earpiece and auxiliary plug connector.

It is another object of the present invention to provide an auxiliary plug storage receptacle for conformably encompassing the contour of the auxiliary plug connector in a snug manner.

It is another object of the present invention to provide a cable guidance column to facilitate both restrainment of the electrical conducting cable when not in use, and to aid in directing the electrical conducting cable into the protective housing when being wound therein.

It is another object of the present invention to provide an earpiece retention jacket for supporting the audio receiver earpiece when not in use.

Briefly described according to one embodiment of the present invention, a cellular communication device with integral headset retraction assembly is provided. The device is defined as a traditional cellular communication phone with headset retraction device integrally formed along a rear side thereof. The traditional cellular communication phone as described herein includes elements and features commonly associated with existing cellular phones.

A headset retraction device is integrally molded to a lower portion of the rear side of the phone. The headset retraction device comprises a generally square-shaped retraction housing measuring approximately 1 7/16 inches squared which serves to store a cable reel. The cable reel includes a springbiased cable retracting mechanism and an electrical conducting cable wound within retraction housing and attached to the cable retracting mechanism. The cable reel is rotatably attached to an axle being mounted to a rear sidewall of the retraction housing. The cable reel further includes a ring protrusion projecting therefrom for providing a compartment within which the cable retracting mechanism is installed. The cable retracting mechanism is fixedly installed with a spiral spring for resiliently biasing the cable reel relative to the retraction housing.

The electrical conducting cable has an extendible end opposite a fixed end. The extendible end includes an audio receiver earpiece electrically connected at an upper extreme end thereof. The fixed end includes an auxiliary plug connector electrically connected thereto. The auxiliary plug connector is attached within cable reel and extends approximately 1 ¾ inches therefrom through a hole in a bottom sidewall of housing in a non-retractable manner.

A micro-sized microphone, having a length of approximately 12.7 mm and a diameter of approximately 5.4 mm, is electrically connected between the audio receiver earpiece and auxiliary plug connector. The micro-sized microphone and the audio receiver earpiece are separated by a distance of approximately 6 inches. The distance from the audio receiver earpiece to the electrical conducting cable's attachment to the cable retracting mechanism measures approximately 40 inches.

The cable reel facilitates extension by the electrical conducting cable from the retraction housing to substantially a full length thereof. In order to draw the electrical conducting cable from the cable reel, the audio receiver earpiece is grasped and pulled by the user to a suitable length followed by a slight release, thereby actuating tension being applied by a reel lock button against the cable retracting mechanism, thereby arresting rotation thereof so as to effectively lock the electrical conducting cable in position. Subsequent pulling of the electrical conducting cable to an extended full length thereof triggers actuation of the cable retracting mechanism, thereby allowing the electrical conducting cable to be completely wound into retraction housing.

In order to prevent free suspension of the auxiliary plug connector when not in use, an auxiliary plug storage receptacle is provided. The auxiliary plug storage receptacle is a specially molded impingement cavity which conformably encompasses the contour of the auxiliary plug connector in a snug manner. The impingement cavity is designed and configured having a depth which permits an outer surface of the auxiliary plug connector and the forward sidewall of the retraction housing to lie in the same plane.

A cable guidance column is provided to facilitate both restrainment of the electrical conducting cable when not in use, and to aid in directing the electrical conducting cable into the retraction housing when being wound therein. The cable guidance column is of a linearly, elongated tubular configuration, with opposed open portals for allowing passage of the electrical conducting cable therethrough. The cable guidance column is mounted vertically, in a perpendicular manner to an upper sidewall of retraction housing, and has a length measuring approximately 1 ¾ inches, and a diameter measuring approximately 6 mm. During periods when the headset retraction device is not employed, the cable guidance column also prevents inadvertent entanglement by the electrical conducting cable with articles in close proximity thereto.

An earpiece retention jacket is disclosed for supporting the audio receiver earpiece when not in use. The earpiece retention jacket is of an arcuate configuration mounted to an upper portion of the rear side of phone housing, just above the cable guidance column.

The use of the present invention allows a cellular communication phone to be used in a hands-free manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Referring now to FIGS. 1–3, and 5–6 a cellular communication device with integral headset retraction assembly 10 is shown, according to the present invention, comprised of a cellular communication phone 15 with headset retraction device 30 integrally formed along a rear side 25 thereof, The cellular communication phone 15 is defined herein as including but is not limited by the following elements and features commonly associated with existing cellular phones. The cellular communication phone 15 has a protective housing 20 which encloses internal electrical circuitry and components. The housing 20 has a top portion 21 opposite a bottom portion 22 having downwardly depending sidewalls 23a, 23b and a front side 24 opposite a rear side 25. Mounted to the top portion 21 is an antenna 26 for receiving and transmitting digital and analog signals. A microphone 27 for converting a transmitted sound into a sound signal is located on the front side 24 along a lower extremity thereof. An audio receiver 28 for generating audible sound in response to reception of digital and analog signals is located on the front side 24 along an upper extremity thereof. A plurality of operational dials 42 and a keypad 44 are included for executing various functions in a conventional manner as are associated with a cellular communication phone 15. The plurality of operational dials 42 align each downwardly depending sidewall 23a, 23b. The keypad 44 is positioned on the face 35 of the front side 24 of the phone 15, just above the microphone 27 Also located on the face 35 of the phone 15 above the keypad 44 is an alphanumeric display 48 for displaying various datum commonly utilized when operating a cellular communication phone 15.

Figure 1:
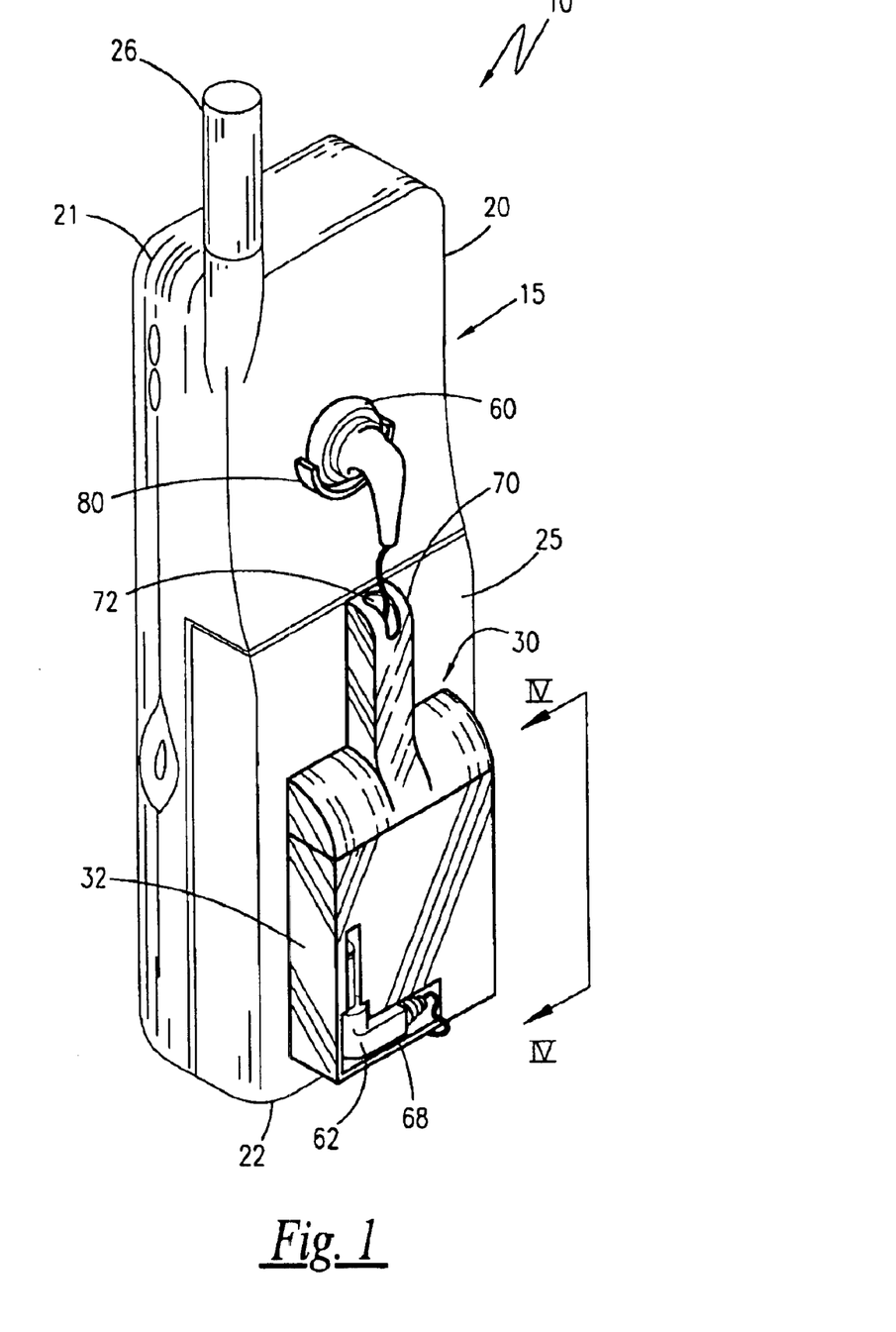
FIG. 1 is a perspective view of a cellular communication device with integral headset retraction assembly according to the preferred embodiment of the present invention.
Figure 2:
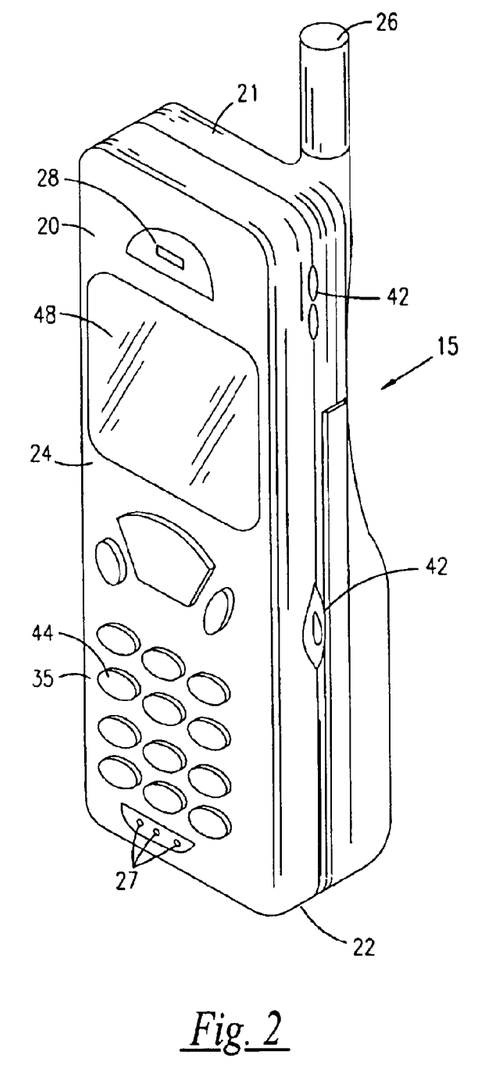
FIG. 2 is a perspective view of a traditional cellular communication phone.
Figure 3:
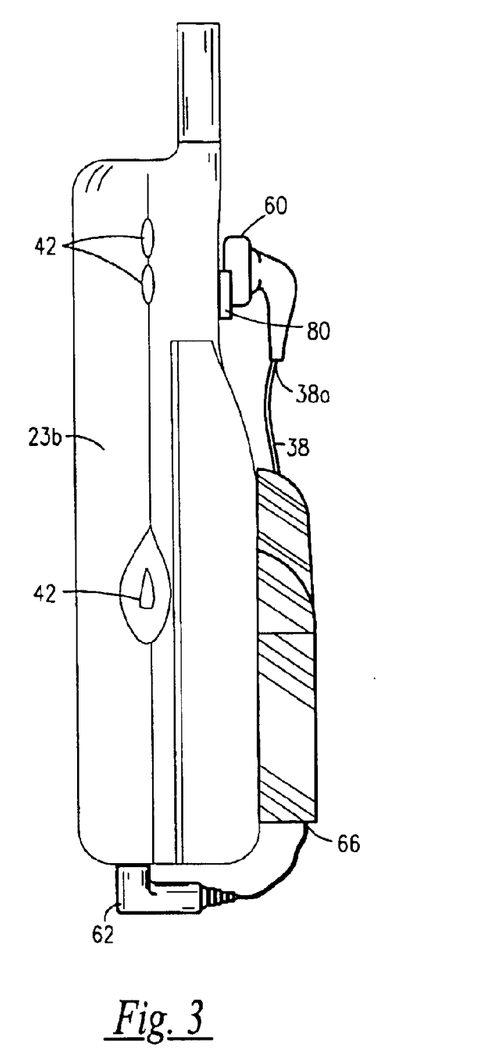
FIG. 3 is a side elevational view of the cellular communication device with integral headset retraction assembly according to the preferred embodiment of the present invention.
Figure 4:
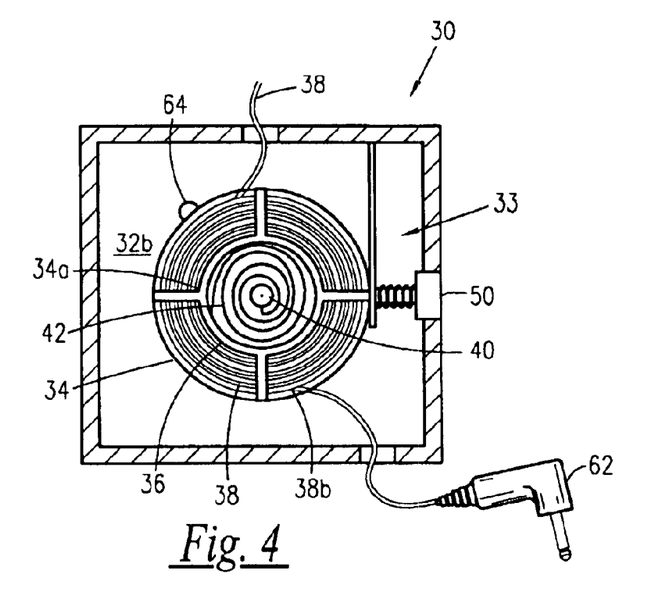
FIG. 4 is a cross-sectional view of the housing of the headset retraction device of the present invention taken along lines IV—IV of FIG. 1.
Figure 5:
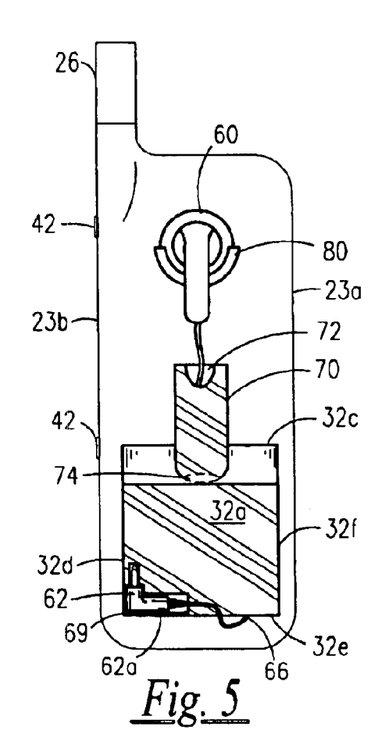
FIG. 5 is a top plan view of the cellular communication device with integral headset retraction assembly according to the preferred embodiment of the present invention.
Figure 6:
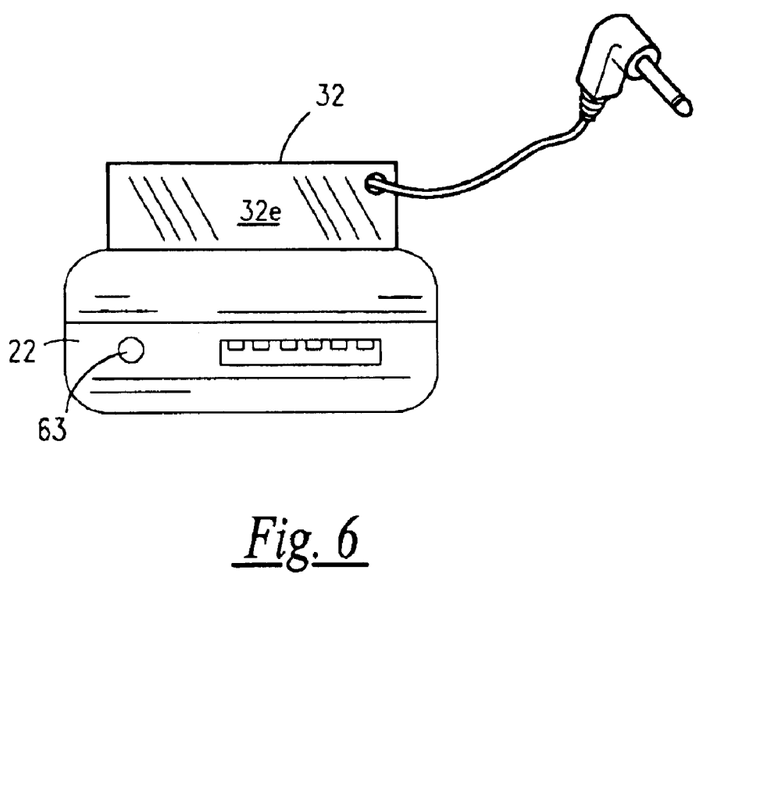
FIG. 6 is a bottom end view thereof.

Referring generally to FIGS. 1–7, and more specifically to FIG. 4, the headset retraction device 30 is shown integrally molded to a lower portion of the rear side 25 of the phone 15. As an integral component of the phone 15, the headset retraction device 30 imparts important functional utility to the present invention as will be described hereinbelow.

The headset retraction device 30 comprises a generally square-shaped retraction housing 32 measuring approximately 1 7/16 inches squared which serves to store a cable retractor 33, shown herein as a cable reel 34. The retraction housing 32 is further defined as having a forward sidewall 32a opposite a rear sidewall 32b, and a pair of downwardly depending opposed sidewalls 32d, 32f which perpendicularly adjoins forward sidewall 32a and rear sidewall 32b. The retraction housing 32 further includes a generally inclined upper wall 32c affixed atop the pair of opposed sidewalls 32*d*, 32*f*, and inclined upper wall 32*c* opposes a bottom sidewall 32*e* being formed integral in a perpendicular manner to the pair of opposed sidewalls 32*d*, 32*f*.

The cable reel 34 includes a spring-biased cable retracting mechanism 36 and an electrical conducting cable 38 (to be described in greater detail below) wound within retraction housing 32 and attached to the cable retracting mechanism 36. The cable reel 34 is rotatably attached to an axle 40 being mounted to the rear sidewall 32*b* of the retraction housing 32. The cable reel 34 includes a ring protrusion 34*a* projecting therefrom for providing a compartment within which the cable retracting mechanism 36 is installed. The cable retracting mechanism 36 is fixedly installed with a spiral spring 42 for resiliently biasing the cable reel 34 relative to the retraction housing 32.

The electrical conducting cable 38 has an extendible end 38*a* opposite a fixed end 38*b*. The extendible end 38*a* includes an audio receiver earpiece 60 electrically connected at an upper extreme end thereof. The audio receiver earpiece 60 is of a circular configuration having a diameter permitting a snug fit within an ear of an average user.

The fixed end 38*b* of the electrical conducting cable 38 includes an auxiliary plug connector 62 electrically connected thereto. The auxiliary plug connector 62 is of a configuration designed to be plugged into an auxiliary plug jack 63 universally known in the art as associated with a traditional cellular communication phone 15. The auxiliary plug connector 62 is attached within cable reel 34 and extends approximately 1 ¾ inches therefrom through hole 66 in bottom sidewall 32*e* of retraction housing 32 in a non-retractable manner.

A micro-sized microphone 64, having a length of approximately 12.7 millimeters (mm) and a diameter of approximately 5.4 mm, is electrically connected between the audio receiver earpiece 60 and auxiliary plug connector 62. The micro-sized microphone 64 and the audio receiver earpiece 60 are separated by a distance of approximately 6 inches. The distance from the audio receiver earpiece 60 to the electrical conducting cable's 38 attachment to the cable retracting mechanism 36 measures approximately 40 inches.

The cable reel 34 facilitates extension by the electrical conducting cable 38 from the retraction housing 32 to substantially a full length thereof. In order to draw the electrical conducting cable 38 from the cable reel 34, the audio receiver earpiece 60 is grasped and pulled by the user to a suitable length whereby the audio receiver earpiece 60 can reside comfortably within user's ear. After obtaining such suitable length, the electrical conducting cable 38 is released slightly in a retracting manner thereby actuating tension being applied by a spring-biased reel lock button 50 against the cable retracting mechanism 36 so as to arrest rotation thereof, thereby effectively locking the electrical conducting cable 38 in position. Subsequent pulling of the electrical conducting cable 38 to an extended full length thereof from the retraction housing 32 triggers actuation of the cable retracting mechanism 36, thereby allowing the electrical conducting cable 38 to be completely wound into retraction housing 32 in a manner unimpeded by the spring-biased reel lock button 50. The reel lock button 50 with compression spring 51 is mounted along an interior side of sidewall 32*f* and is designed so as to be operationally engageable with cable retracting mechanism 36 so as to perform in the aforementioned described manner.

The cable retractor 33 and its associated components are known in the art for performing in the above-described manner, and as such, will be obvious to a person of ordinary skill. Thus, the exact design and configuration regarding means or mechanism for retracting electrical conducting cable 38 is not critical to this invention. However, it is the integral nature of the cellular communication device with headset retraction assembly that is critical to the present invention, and intrinsically, dimensional characteristics attributable to elements heretofore and hereinafter described are likewise critical.

In order to prevent free suspension of the auxiliary plug connector 62 when not in use, an auxiliary plug storage receptacle 68 is provided, shown herein as an impingement cavity 69 specially molded along a lower portion of the forward sidewall 32*a* of retraction housing 32 so as to conformably encompass the contour of auxiliary plug connector 62 in a snug manner. The impingement cavity 69 is designed and configured having a depth which permits an outer surface 62*a* of the auxiliary plug connector 62 and the forward sidewall 32*a* of the retraction housing 32 to lie in the same plane.

A cable guidance column 70 is provided to facilitate both restrainment of the electrical conducting cable 38 when not in use, and to aid in directing the electrical conducting cable 38 into the retraction housing 32 when being wound therein. The cable guidance column 70 is defined as having a linearly, elongated tubular configuration, with opposed open portals 72, 74 for allowing passage of the electrical conducting cable 38 therethrough. The cable guidance column 70 is mounted vertically atop inclined upper wall 32*c* of retraction housing 32 along a linearly elongated centerline thereof, and has a length measuring approximately 1 ¾ inches, and a diameter measuring approximately 6 mm. During periods when the headset retraction device 30 is not employed, the cable guidance column 70 also prevents inadvertent entanglement by the electrical conducting cable 38 with articles in close proximity thereto.

Figure 7:
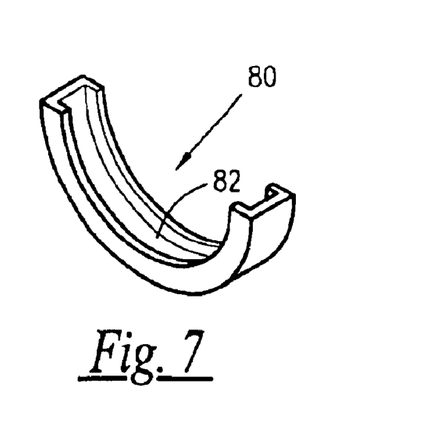
FIG. 7 is a side elevational view of the earpiece retention jacket.

An earpiece retention jacket 80 is disclosed for supporting the audio receiver earpiece 60 when not in use. The earpiece retention jacket 80 is of an arcuate configuration mounted to an upper portion of the rear side 25 of housing 20, just above the cable guidance column 70. The earpiece retention jacket 80 includes an elongated slot 82 specially formed within an upper extremity thereof and extending arcuately a length theredown for removably accommodating an elliptical edge 61 of the audio receiver earpiece 60.

Figure 8A:
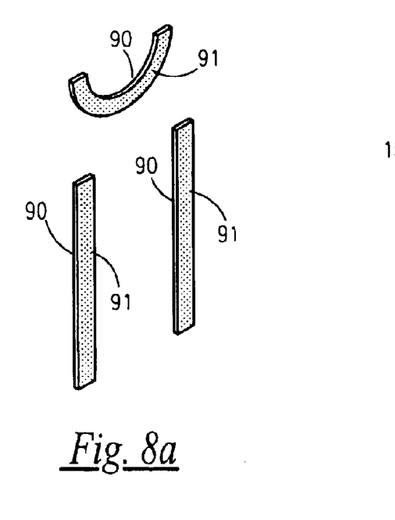
FIG. 8a illustrates strips of adhesive to be utilized with an alternate embodiment of the present invention.
Figure 8B:
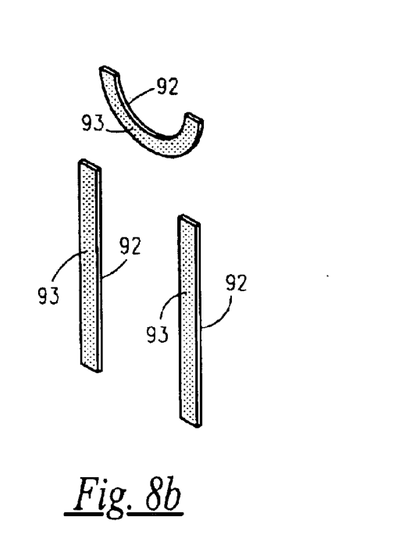
FIG. 8b illustrates complementary strips of adhesive to be utilized with the alternate embodiment of the present invention.
Figure 8C:
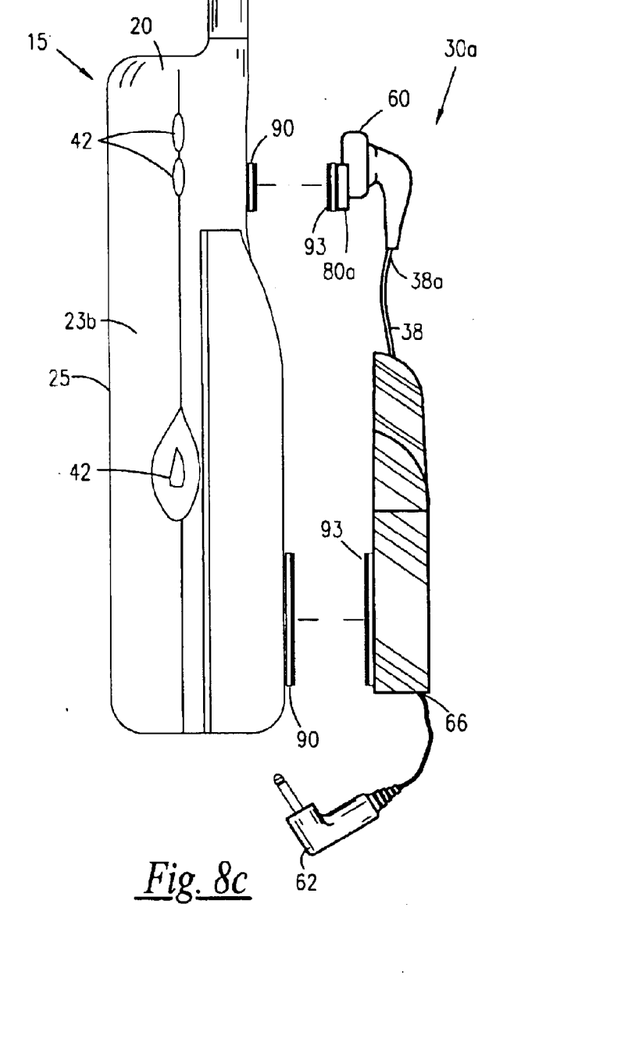
FIG. 8c is an exploded perspective view of the alternate embodiment of the present invention.

Finally, referring now to FIGS. 8*a*–8*c*, an alternate embodiment of the present invention is shown, wherein a removably attachable headset retraction device 30*a* is designed and configured so as to be removably secured to the rear side 25 of the housing 20 of a cellular communication phone 15.

It is envisioned that strips of adhesive 90, each having a layer of hook-and-loop fastener material 91, such as VELCRO™, on a reverse side thereof, are adhered in a suitably aligned manner along a lower portion and upper portion of the rear side 25 of the housing 20 of phone 15. Complementary strips of adhesive 92, each having a layer of hook-and-loop fastener material 93 on a reverse side thereof, are adhered to the rear sidewall 32*b* of retraction housing 32, and a bottom of the earpiece retention jacket 80*a*. The complementary strips of adhesive 92 are adhered to the headset retraction device 30*a*, whereupon the hook-and-loop fastener material 93 thereof is placed in connective contact with the hook-and-loop fastener material 91 of the strips of adhesive 90 adhered to the rear side 25 of housing 20, thereby removably securing the headset retraction device 30*a* to the rear side 25 of the housing 20 of a traditional cellular communication phone 15.

The method of attachment described herein for facilitating removable attachment of the headset retraction device 30*a* to a traditional cellular communication phone 15 is meant merely as a suggestion, and is not intended to be a limiting factor, as it is recognized that other attachment methods such as clamping, snap fastening, and tracking systems may be utilized.

2. Operation of the Preferred Embodiment

To use the present invention, first the user removes the auxiliary plug connector 62 from the auxiliary plug storage receptacle 68 and inserts the auxiliary plug connector 62 within the auxiliary plug jack 63. Next, user grasps the audio receiver earpiece 60 and removes it from the earpiece retention jacket 80, and pulls the electrical conducting cable 38 to a suitable length such that the audio receiver earpiece 60 can comfortably reside within user's ear. After obtaining such length, the user slightly releases the electrical conducting cable 38 in a retracting manner so as to effectively lock the electrical conducting cable 38 in position. In the event the chosen length is inaccurate, the user again pulls the electrical conducting cable 38 to a desired length and slightly releases the electrical conducting cable 38 in a retracting manner so as to effectively lock the electrical conducting cable 38 in position. After use, in order to fully retract the electrical conducting cable 38, user pulls the electrical conducting cable 38 to an extended full length thereof from the retraction housing 32, thus triggering actuation of the cable retracting mechanism 36 which allows the electrical conducting cable 38 to be completely wound into retraction housing 32 in a manner unimpeded by the spring-biased reel lock button 50. Finally, user places the audio receiver earpiece 60 in the earpiece retention jacket 80, removes the auxiliary plug connector 62 from the auxiliary plug jack 63, and stores the auxiliary plug connector 62 within the auxiliary plug storage receptacle 68.

The use of the present invention allows a cellular communication phone to be used in a hands-free manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A cellular communication device with integral headset retraction assembly comprising:

a cellular communication phone having a headset retraction device integrally formed along a rear side of said cellular communication phone, said headset retraction device comprising:

a retraction housing, said retraction housing is of a generally square-shaped configuration, said retraction housing measuring approximately 1 7/16 inches squared which serves to store a cable retractor, said retraction housing having a forward sidewall opposite a rear sidewall, and a pair of downwardly depending opposed sidewalls which perpendicularly adjoins said forward sidewall and said rear sidewall, and wherein said retraction housing further having a generally inclined upper wall affixed atop said pair of opposed sidewall, wherein said inclined upper wall opposes a bottom sidewall, said bottom sidewall being integrally formed perpendicular to said pair of opposed sidewalls, and wherein said cable retractor is defined as cable reel, wherein said cable reel includes spring-biased cable retracting mechanism and an electrical conducting cable wound within said retraction housing and attached to said cable retracting mechanism, and wherein said cable reel facilitates extension by said electrical conducting cable from said retraction housing to substantially a full length of said electrical conducting cable;

an auxiliary plug storage receptacle, said auxiliary plug storage receptacle is defined as an impingement cavity specially molded along a lower portion of said forward sidewall of said retraction housing;

a cable guidance column, said cable guidance column is defined as having a linearly, elongated tubular configuration, with opposed open portals for allowing passage of said electrical conducting cable, said cable guidance column is mounted vertically, in a perpendicular manner to an inclined upper wall of said retraction housing along a linearly elongated centerline of said inclined upper wall, said cable guidance column has a length measuring approximately 1¼ inches and a diameter measuring approximately 6 mm, and wherein said cable guidance column facilitates restrainment of said electrical conducting cable during periods of nonuse, aids in directing said electrical conducting cable into said retraction housing when being wound within said retraction housing, and prevents inadvertent entanglement by said electrical conducting cable with articles in close proximity to said electrical conducting cable; and an earpiece retention jacket.

2. The cellular communication device with integral headset retraction assembly of claim 1, wherein said cable reel is rotatably attached to an axle mounted to said rear sidewall of said retraction housing, said cable reel includes a ring protrusion projecting therefrom for providing a compartment within which said cable retracting mechanism installed, and wherein said cable retracting mechanism is fixedly installed with a spiral spring for resiliently biasing said cable reel relative to said retraction housing.

3. The cellular communication device with integral headset retraction assembly of claim 1, wherein said electrical conducting cable has an extendible end opposite a fixed end, wherein said extendible end includes an audio receiver earpiece electrically connected at an upper extreme end of said electrical conducting cable, wherein said fixed end includes an auxiliary plug connector electrically connected to said fixed end, said auxiliary plug connector is of a configuration designed to be plugged into an auxiliary plug jack.

4. The cellular communication device with integral headset retraction assembly of claim 3, wherein said auxiliary plug connector is attached within said cable reel and extends approximately 1¾ inches from said cable reel through a hole in said bottom sidewall of said retraction housing in a non-retractable manner.

5. The cellular communication device with integral headset retraction assembly of claim 4, wherein said auxiliary plug connector having a contour being conformably encompassed by said impingement cavity in a snug manner, and wherein said impingement cavity is configured with a depth which permits an outer surface of said auxiliary plug connector and said forward sidewall of said retraction housing to lie in a same plane.

6. The cellular communication device with integral headset retraction assembly of claim 3, wherein said electrical conducting cable includes a micro-sized microphone, said micro-sized microphone having a length of approximately 12.7 mm and a diameter of approximately 5.4 mm, said micro-sized microphone is electrically connected between said audio receiver piece and said auxiliary plug connector, wherein said micro-sized microphone and said audio receiver earpiece are separated by a distance of approximately 6 inches.

7. The cellular communication device with into headset retraction assembly of claim 1, wherein said headset retraction device further comprises a spring-biased reel lock button with compression spring mounted along an interior side of a lateral sidewall of said pair of downwardly depending opposed sidewalls of said retraction housing, wherein said spring-biased reel lock button is designed so as to be operationally engageable with said cable retracting mechanism in such a manner whereby after pulling said electrical conduct cable to a desired length, said electrical conducting cable is released slightly in a retracting manner thereby actuating said spring-biased reel lock button so as to apply tension against said cable retracting mechanism, thereby arresting rotation of said cable retracting mechanism and effectively locking said electrical conducting cable in position, and wherein a subsequent pulling of said electrical conducting cable to an extended full length from said retraction housing triggers actuation of said cable retracting mechanism so as to allow said electrical conducting cable to be completely wound into said retraction housing in a manner unimpeded by said spring-biased reel lock button.

8. The cellular communication device with integral retraction assembly of claim 1, wherein said earpiece retention jacket is of an arcuate configuration mounted to an upper portion of a rear side of housing of said cellular communication phone, just above said cable guidance column, and wherein said earpiece retention jacket includes an elongated slot specially formed within an upper extremity of said earpiece retention jacket and extending accurately a length theredown for removably accommodating an elliptical edge of an audio receiver earpiece.

9. A cellular communication device with integral headset retraction assembly comprising:

a cellular communication phone having headset retraction device integrally formed along a rear side of said cellular communication phone, said headset retraction device comprising:

a retraction housing, said retraction housing is of a generally square-shaped configuration, said retraction housing measuring approximately 1 7/16 inches squared which serves to store a cable retractor, said retraction housing having a forward sidewall opposite a rear sidewall, and a pair of downwardly depending opposed sidewalls which perpendicularly adjoins said forward sidewall and said rear sidewall, and wherein said retraction housing further a generally inclined upper wall affixed atop said pair of opposed sidewalls, wherein said inclined upper wall opposes a bottom sidewall, said bottom sidewall being integrally formed perpendicular to said pair of opposed sidewalls, and wherein said cable retractor is defined as a cable reel wherein said cable reel includes a spring-biased cable retracting mechanism and an electrical conducting cable wound within said reaction housing and attached to said cable retracting mechanism, and wherein said cable reel facilitates extension by said electrical conducting cable from said retraction housing to substantially a full length of said electrical conducting cable;

an auxiliary plug storage receptacle aid auxiliary plug storage receptacle is defined as an impingement cavity specially molded along a lower portion of said forward sidewall of said retraction housing;

a cable guidance column, said cable guidance column is defined as having a linearly, elongated tubular configuration, with opposed open portals for allowing passage of said electrical conducting cable, said cable guidance column is mounted vertically, in a perpendicular manner to an inclined upper wall of said retraction housing along a linearly elongated centerline of said inclined upper wall, said cable guidance column has a length measuring approximately 1 3/4 inches and a diameter measuring approximately 6 mm, and wherein said cable guidance column facilitates restrainment of said electrical conducting cable during periods of nonuse, aids in directing said electrical conducting cable into said retraction housing when being wound within said retraction housing, and prevents inadvertent entanglement by said electrical conduct cable with articles in close proximity to said electrical conducting cable;

an earpiece retention jacket, said earpiece retention jacket is of an arcuate configuration mounted to an upper portion of a rear side of a housing of said cellular communication phone, just above said cable guidance column;

a plurality of strips of adhesive, wherein each strip of said plurality of strips of adhesive has a layer of hook-and-loop fastener material on a reverse side of said strip, said plurality of strips are adhered in a suitably aligned manner along a lower portion and an upper portion of the rear side of the housing of said cellular communication phone; and a plurality of complementary strips of adhesive, wherein each strip of said plurality of complementary strips of adhesive has a layer of hook-and-loop fastener material on a reverse side thereof so as to be adhered to said rear sidewall of said retraction housing of said headset retraction device, and a bottom of said earpiece retention jacket.

10. The cellular communication device with integral headset retraction assembly of claim 9, wherein said layer of hook-and-loop fastener material of said plurality of complementary snips of adhesive is placed in connective contact with said layer of hook-and-loop fastener material of said plurality of strips of adhesive, thereby removably securing said headset retraction device to the rear side of the housing of said cellular communication phone.

* * * * *